United States Patent [19]
Lee et al.

[11] Patent Number: 4,737,030
[45] Date of Patent: Apr. 12, 1988

[54] APPARATUS AND METHOD FOR ANALYZING SPECTRAL RADIANCE

[75] Inventors: Paul H. Lee, Goleta, Calif.; Frederick B. Brown, Reno, Nev.

[73] Assignee: Southern California Edison Company, Rosemead, Calif.

[21] Appl. No.: 698,640

[22] Filed: Feb. 6, 1985

[51] Int. Cl.[4] .............................. G01J 3/14; G01J 3/18
[52] U.S. Cl. .................................... 356/326; 356/328; 356/333
[58] Field of Search ............... 356/216, 219, 300, 308, 356/326, 328, 331, 332, 333, 334; 364/498

[56] References Cited

U.S. PATENT DOCUMENTS

| 2,948,185 | 8/1960 | Ward et al. | 356/333 |
| 3,098,408 | 7/1963 | Cary | 356/333 |
| 3,723,007 | 3/1973 | Leonard | 356/301 |
| 3,869,212 | 3/1975 | Barcher et al. | 356/328 |
| 4,310,243 | 1/1982 | Brown et al. | 356/326 |

FOREIGN PATENT DOCUMENTS 0855411  8/1981  U.S.S.R. ............... 356/331

OTHER PUBLICATIONS

Anderson et al., *Anal. Chem.*, V. 53, No. 6, May, 1981, pp. 770–775.
Ratzlaff, *Anal. Chem.*, V. 52, No. 6, May, 1980, pp. 916–920.
Wood et al., *American Laboratories*, V. 11, No. 3, Mar. 1979, pp. 16–29.
Zweibaum, *Proceedings SPIE*, V. 170, Jan. 1979, pp. 91–106.
Heaps, *Appl. Optics*, V. 10, No. 9, Sep. 1971, pp. 2045–2059.

*Primary Examiner*—F. L. Evans
*Attorney, Agent, or Firm*—Sheldon & Mak

[57] ABSTRACT

A computer controlled optical system for automatically acquiring and storing spectral radiance data for a multiplicity of targets. Several measurement modes are available for each target ranging from a single wavelength measurement to measurement over a plurality of discrete wavelengths. Stepping motive means prompted by computer instructions direct the apparatus to a given set of target coordinates.

31 Claims, 1 Drawing Sheet

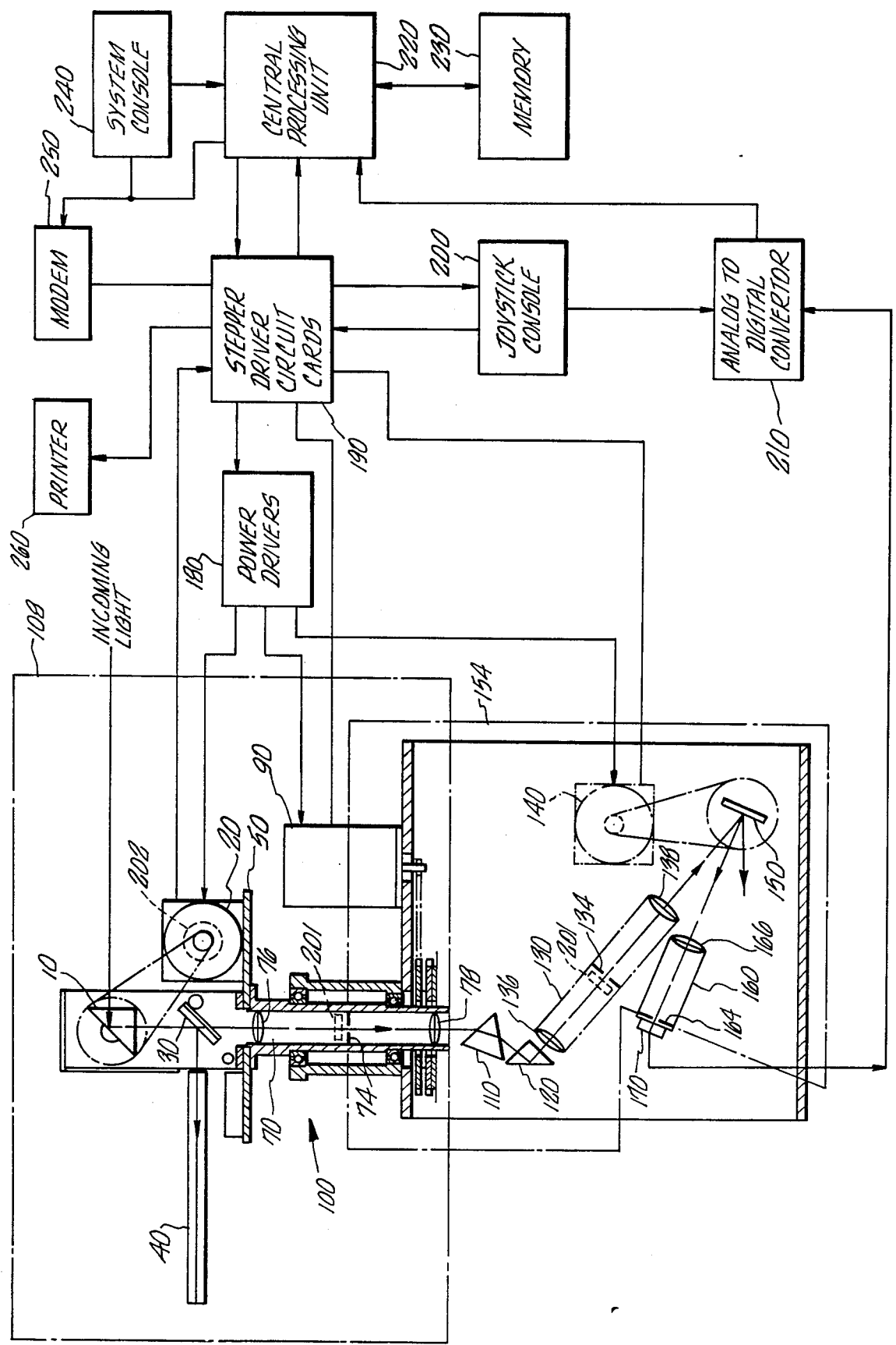

APPARATUS AND METHOD FOR ANALYZING SPECTRAL RADIANCE

BACKGROUND OF THE INVENTION

This invention relates to measuring the spectral radiance of a multiplicity of targets and storing the measurement data. In particular the invention is directed to spectroradiometric apparatus and a method whereby an optical system is controlled by a dedicated computer to automatically measure and store spectral radiance data over a wide range of wavelengths for any given target and to automatically scan a number of targets.

Spectroradiometers are used to analyze the spectral content of radiation emanating from a given region or target. They serve to separate light incident from the target into its spectral components and then detect and record this information for analysis.

Measurements of the spectral radiance of a given field of view can be used to determine visual range through the atmosphere. This range can be quantified by measuring the spectral radiance of the sky just above the horizon and that of a terrain feature immediately below and then contrasting these measurements. Spectral radiance measurements can also reveal the atmospheric composition of a given region.

In the prior art, measurements of spectral radiance have only been accomplished by using bulky and cumbersome equipment with great power requirements. All equipment is stationed in the field during use and requires transportation, or at least field readjustment, to alter the target area under analysis.

A by-product of this lack of versatility among prior art systems is inconsistency of spectral radiance measurements.

In U.S. Pat. No. 4,329,050 (Olsen), there is disclosed a spectroradiometer for gathering data along an entire narrow line of a two-dimensional field of view simultaneously. An array of charge coupled devices serves as a detector. The spectroradiometer monitors a region of the earth from an aircraft or spaceship.

This device does not provide for selection of a particular wavelength or wavelengths to be analyzed. It also scans a narrow line rather than a multiplicity of targets.

In U.S. Pat. No. 3,985,442 (Smith), there is disclosed a data acquisition system for a spectrophotometer employing a diffraction grating sequentially moved to a plurality of test positions. This system is to be used in the spectral analysis of materials, particularly luminescent materials, rather than the analysis of the visual range or composition of the atmosphere. It makes no provision for target scanning.

Thus in the prior art there does not exist the apparatus or method for automatically analyzing spectral radiance over a wide range of wavelengths for a multiplicity of targets. Such an apparatus or method can yield consistent measurements and maximize ease of operation.

SUMMARY OF THE INVENTION

There is provided spectroradiometric apparatus and a method for automatically measuring spectral radiance over a wide range of wavelengths for a multiplicity of targets. Spectral radiance data is processed and can then be stored in a dedicated computer. The computer also controls the automatic scanning of targets and spectral band selection.

The spectroradiometer apparatus comprises a sensor head having a hollowed body portion with at least a portion of the sensor head being movable, directing means for channelling radiation from a preselected source into the hollowed body portion of the sensor head, means for selectively moving the portion of the sensor head to receive the radiation, means for selectively positioning the directing means to receive the radiation, and means for separating the radiation emanating from the hollowed body portion into its spectral components.

Electronic means processes data representative of at least part of the spectral components and controls the movement of the movable portion of the sensor head and the positioning of the directing means.

Initial target selection can be accomplished by manipulation of a joystick by an operator. With the aid of the computer and stepping motive means, such manipulation causes the rotation of reflecting means along orthogonal axes. This allows for selection of elevational and azimuthal coordinates.

Once selected, the coordinates of a given target can be stored in the computer. This process may be repeated for a multiplicity of targets. Automatic scanning of these targets can then be controlled by the computer through the stepping motive means.

For each target to be analyzed, various modes of spectral data measurements are available. These range from a single wavelength measurement to measurement over a plurality of discrete wavelengths. Once the desired mode is selected, measurements are controlled by the computer, within which are stored the various parameters for a given target.

An advantage of the present invention is its automatic operation. This attribute provides for consistency of measurements and alleviates the need for constant operator control and monitoring of the system.

Another related advantage of the present invention is its capability for remote access. Computer control allows the system to interface with a broad range of communication devices which alleviates the need for an operator to be present at the site of the system at the time it is operating.

A further advantage of the present invention is its portability. No bulky equipment need be moved when changing the target to be analyzed.

These and other advantages and the various features of the present invention will become more readily apparent upon reviewing the ensuing detailed description taken in conjunction with the accompanying drawing.

BRIEF DESCRIPTION OF THE DRAWING

The FIGURE is a diagrammatic view of optical and electronic features of the present invention with electronic features represented in block form.

DESCRIPTION OF THE PREFERRED EMBODIMENTS

Referring now to the FIGURE, there is shown spectroradiometric apparatus for measuring spectral radiance including a sensor head 108 having a hollowed body portion 100 with at least a portion of the sensor head 108 being movable and directing means having rotatable reflecting means 10 selectively rotated by motive means 20, 90 to direct incoming light into the hollowed body portion 100 and to a spectrometer 154. Once separated into its spectral components by the spectrometer 154, the light falls on a photodetector 170 for conversion into an electrical signal for ultimate processing and storage by a computer 220, 230.

Light enters the system and impinges upon rotatable reflecting means 10. The rotatable reflecting means 10 can be rotated about orthogonal axes, as described below, to define the direction of the apparatus.

If folding mirror 30 is positioned in the optical path, light is directed through a spotting scope 40. This enables an operator to visually select the target desired to be analyzed. If the folding mirror 30 is not positioned in the optical path, the light proceeds through field stop lens means 70 where it is focused on a field stop circular aperture 74 by lens 76. The aperture 74 defines the field of view of the instrument. The circularity of the aperture 74 allows for rotation of the system for target selection and scanning as described below. The diameter of the aperture 74 is variable.

Upon exiting the field stop lens means 70 through lens 78, the light falls on prism means 110 where it is dispersed into its spectral components. The prism means 110 is also rotatable, as described below.

Once dispersed by the prism means 110, the light is directed via reflective means 120 into order stop lens means 130 where it is focused on an order stop aperture 134 by lens 136. Light from lens 138 of the order stop lens means 130 then falls on rotatable diffraction grating 150. The prism means 110, along with its adjacent lens means 70, 130 and apertures 74, 134, constitutes a tunable prism monochromater that serves as a low resolution order-sorter. The diffraction grating 150 then serves as a high resolution monochromater. Mechanical linking of the prism means 110 and the diffraction grating 150 allows them to be tuned to the same wavelength, thus forming a double monochromater arrangement. This can also be accomplished by independently rotating the prism means 110 and the diffraction grating 150, but would require additional motive means and thus add complexity and cost to the system.

After being diffracted by the diffraction grating 150, light enters color stop lens means 160 and is focused by lens 166 on a color stop aperture 164. This final aperture 164 defines the band of wavelengths to reach the photodetector 170. The photodetector 170 then transforms the light into an analog electrical signal. This signal is converted into digital form by an analog to digital converter 210 to facilitate processing and storage by the computer 220, 230.

A solenoid actuated shutter 201 can be placed in front of any of the apertures 74, 134, 164, ideally in front of the order stop aperture 134, to interrupt the passage of light through the apparatus. Controlled by the computer, the shutter closes to allow sensing of the dark current in the photodetector 170 prior to each measurement. The dark current signal is then "subtracted" from the spectral measurement signals to provide accurate spectral radiance data.

Alternatively, a "chopper" may be used to accomplish the same function. A rotating disk with radially aligned slits can be used in place of the shutter. Rotating the disk would alternately permit and interrupt the passage of light at a certain frequency. Linking this "chopper" to the computer would enable spectral data to be measured when light passed through a slit and dark current to be measured when light was blocked. This would provide an ongoing assessment of dark current and thus enhance the accuracy of the system.

Motive means 20, 90 selectively rotates the rotating reflecting means 10 about each of two orthogonal axes in stepwise fashion to control the direction of view in azimuth and elevation. Preferably, first motive means 20 vertically rotates the rotating reflecting means 10 to position the apparatus on an elevational coordinate and second motive means 90 horizontally rotates a turntable 50, upon which the rotating reflecting means 10 is stationed, to move the apparatus to an azimuthal coordinate.

Third motive means 140 axially rotates the diffraction grating 150 in stepwise fashion. This motive means 140 may be linked to prism means 110, as mentioned above.

Each motive means 20, 90, 140 includes electro-optical means 202 for detecting its position. A disc featuring a radial slot one step in width is attached to the shaft of each motive means 20, 90, 140. The position of the slot is detected by an optical emitter-detector pair. Detection of the slot is deemed the "home" position. Position of the motive means can be determined by counting the number of steps from the "home" position.

All functions of the present invention are controlled by a dedicated computer. The computer also serves to process and record the data received by the optical components of the present invention, as well as data relating to the operation of the mechanical components, such as position of the motive means 20, 90, 140 as discussed above. At the core of the computer is a central processing unit (CPU) 220 of the type manufactured by National Semiconductor (NSC 800 CMOS chip). This CPU 220 is a programmable eight bit microprocessor featuring 104 Kbytes of RAM memory, time-out circuitry which resets the system hardware if the software is not operating properly, and address decoding circuitry for all memory 230 and attached devices. Battery backup allows for continued functioning of the computer in the event of a power outage.

The computer operates in two modes: (1) target selection, and (2) routine data acquisition mode. In target selection mode, a portable joystick console 200 is used to control the first and second motive means 20, 90. A joystick mounted on the console 200 is manipulated to select the target desired to be analyzed. Potentiometers connected to each axis of the joystick provide a signal representative of the position of the joystick to the analog to digital converter 210. The resulting digital signal is processed by the CPU 220 to generate appropriate commands to the first and second motive means 20, 90 through stepper driver circuit cards 190 and power drivers 180. Using the spotting scope 40 as described above, an operator can thus select a target to be analyzed. Depressing a button on the joystick console 200 logs the target coordinates into the computer. This process may be repeated for a multiplicity of targets.

Another button on the joystick console 200 indicates to the CPU 220 that the target counter is to be incremented, and a third button sends the sensor head to a previously logged target via CPU 220 commands to the stepper driver circuit cards 190, as discussed above. A display is mounted on the joystick console 200 to indicate the number of the target under analysis.

Spectral position for each target is input via a system console 240. Several modes of data collection are available. Measurement can be taken for a single wavelength; integration and averaging over a plurality of wavelengths can be performed; or measurements for a plurality of discrete wavelengths can be taken. Data can be stored in the memory 230 for later recall.

A printer 260 can be used to monitor spectral data in the field. Remote access to the system is accomplished by use of a modem 250 linked to a communication line, such as telephone.

In routine data acquisition mode, the computer automatically controls positioning of the apparatus to each preselected set of target coordinates and collects data according to the preselected mode for a given target. At a preset time, the computer turns on and finds the "home" position of the motive means 20, 90, 140 in the manner described above. Position can also be determined by an absolute shaft encoder.

Once "home" is located for each motive means 20, 90, 140, the solenoid actuated shutter is placed in the optical path to block the passage of light through the apparatus and facilitate the sensing of the dark current in the photodetector 170. After this reading is taken, the CPU 220 sends an appropriate signal to one of the stepper driver circuit cards 190 to position the apparatus in the direction of the first target.

The CPU 220 signal is loaded into counters on the stepper driver circuit card 190 which count down in stepwise fashion. Separate counters are used for the azimuth and elevation step counts.

The counts proceed to the address inputs of a programmable read only memory (PROM) located on the same stepper driver circuit card 190 as the counters. Within the PROM are contained step commands which, when addressed, serve to energize the motive means 20, 90. Each output line of the PROM is connected through the power drivers 180 to a given phase of each motive means 20, 90. A given step command energizes a particular combination of output lines of the PROM which, in turn, energizes a particular phase of each motive means 20, 90. This causes the armature of each of the motive means 20, 90 to turn in the direction of the energized phase. In such a manner, the apparatus is positioned on a given target and spectral analysis may proceed.

If multispectral analysis is desired, the third motive means 140 rotates the spectrometer 154 in stepwise fashion through each discrete wavelength band, until spectral radiance has been measured for each and every band. Rotation of motive means 140 is accomplished in the same fashion as with motive means 20, 90, but its controlling circuitry is preferably located on a stepper driver circuit card 190 different from that used for motive means 20, 90. Each radiance measurement is stored, preferably on floppy diskette. Integration over all wavelength bands yields an accurate indication of overall radiance.

Selectable wavelength data may be stored in the memory 236 for averaging over time. If a single wavelength measurement is desired, it too may be stored in the data storage memory for averaging over time.

Once the desired spectral radiance data is acquired for a given target, the apparatus is positioned to the next target in the manner described above. Spectral radiance data is then collected for that target according to the preselected mode. This procedure is then repeated until spectral radiance data has been acquired for all targets.

After all targets have been scanned, the apparatus checks to determine whether the correct positions have been scanned. All motive means 20, 90, 140 are rotated near, but not on, the "home" position. At this point, the computer checks to determine if "home" has not been located. The motive means 20, 90, 140 are then rotated to the "home" position. If the locators sense the "home" position, the check is complete and indicates that proper positioning has occurred. If sensing of "home" occurred in the first instance or did not occur in the second, an error signal is generated to indicate loss of position during the scanning procedure.

In other embodiments of the invention, the spectrometer 154 can be used in conjunction with a camera or a polarimeter.

Many changes and variations may be made in the method and construction providing widely different embodiments and applications for this invention without departing from the scope thereof. All matter contained in the above description as shown in the accompanying drawings shall be interpreted as illustrative and not limiting, the invention being interpreted solely by the scope of the appended claims.

What is claimed is:

1. Spectroradiometer apparatus comprising:
   a sensor head having a hollowed body portion and at least a portion of said sensor head being movable; directing means including rotatable reflective means for channelling radiation from a preselected source into said hollowed body portion of said sensor head; first motive means for selectively moving about a first axis said hollowed body portion of said sensor head and said directing means and said reflective means to receive said radiation; second motive means for selectively moving said reflective means about a second axis substantially orthogonal to the first axis and positioning said directing means to receive said radiation; and means for separating the radiation emanating from said hollowed body portion into its spectral components; and
   electronic means for processing data representative of at least part of the spectral components and for controlling the movement of said hollowed body portion of said sensor head and the movement and positioning of said directing means.

2. The spectroradiometer apparatus of claim 1, wherein said electronic means correlates the preselected source with the data.

3. The spectroradiometer apparatus of claim 1, wherein said sensor head includes field stop lens means for focusing the radiation emanating from said directing means.

4. The spectroradiometer apparatus of claim 3, wherein said field stop lens means includes a field stop circular aperture upon which incoming radiation is focused for delimiting a circular field.

5. The spectroradiometer apparatus of claim 4, wherein said means for separating the radiation includes prism means for dispersing the radiation emanating from said field stop lens means into its spectral components and a diffraction grating for further dispersion of the radiation.

6. The spectroradiometer apparatus of claim 5, wherein said means for separating the radiation includes order stop lens means for focusing the radiation emanating from said prism means and color stop lens means for focusing the radiation emanating from said diffraction grating.

7. The spectroradiometer apparatus of claim 6, wherein said order stop lens means includes an order stop aperture for selection of spectral order and said color stop lens means includes a color stop aperture for selection of spectral band.

8. Apparatus as claimed in claim 1 wherein the first motive means and second motive means are relatively low power requiring means for movement of substantially only the reflective means and hollow body portion.

9. Spectroradiometer apparatus comprising:
a sensor head having a hollowed body portion and at least a portion of said sensor head being movable; directing means including rotatable reflective means for channelling radiation from a preselected source into said hollowed body portion of said sensor head; first motive means for selectively moving about a first axis said hollowed body portion of said sensor head and said directing means and said reflective means to receive said radiation; second motive means for selectively moving said reflective means about a second axis substantially orthogonal to the first axis and positioning said directing means to receive said radiation; and means for separating the radiation emanating from said hollowed body portion into its spectral components; and electronic means having a central processing unit for generating appropriate electrical signals to control the movement of said hollowed body portion of said sensor head and the movement and positioning of said directing means; stepper driver circuit cards for receiving the signals from the central processing unit and generating step commands based on the signals; power drivers for receiving the step commands from the stepper driver circuit cards, and for energizing said means for moving said portion of said sensor head and for positioning said directing means in accordance with the step commands; and an analog to digital converter for converting analog electrical signals representative of at least part of the spectral components into digital electrical signals for processing by the central processing unit.

10. The spectroradiometer apparatus of claim 9, wherein said electronic means correlates the preselected source with the data.

11. The spectroradiometer apparatus of claim 9, wherein said sensor head includes field stop lens means for focusing the radiation emanating from said directing means.

12. The spectroradiometer apparatus of claim 11, wherein said field stop lens means includes a field stop circular aperture upon which incoming radiation is focused for delimiting a circular field.

13. The spectroradiometer apparatus of claim 12, wherein said means for separating the radiation includes prism means for dispersing the radiation emanating from said field stop lens means into its spectral components and a diffraction grating for further dispersion of the radiation.

14. The spectroradiometer apparatus of claim 13, wherein said means for separating the radiation includes order stop lens means for focusing the radiation emanating from said prism means and color stop lens means for focusing the radiation emanating from said diffraction grating.

15. The spectroradiometer apparatus of claim 14, wherein said order stop lens means includes an order stop aperture for selection of spectral order and said color stop lens means includes a color stop aperture for selection of spectral band.

16. Spectroradiometer apparatus comprising:
a sensor head having a hollowed body portion and at least a portion of said sensor head being movable; directing means having rotatable reflecting means for directing incoming radiation into said hollowed body portion of said sensor head; first motive means for rotating said hollowed body portion and said directing means and said reflective means about a first axis; second motive means motor for rotating said rotatable reflecting means about a second axis substantially orthogonal to that of said first axis; field stop lens means for focusing the radiation emanating from said rotatable reflecting means; prism means for dispersing the radiation emanating from said field stop lens means into its spectral components; reflective means for reflecting the radiation emanating from said dispersive prism means; order stop lens means for focusing the radiation emanating from said reflective means; a diffraction grating for further dispersion of the radiation; third motive means for rotating of said diffraction grating; color stop lens means for focusing the radiation emanating from said diffraction grating; and a photodetector for transforming the radiation that has passed through said color stop lens means into an electrical signal; and electronic means for processing data representative of at least part of the spectral components and for controlling the movement of said portion of said sensor head and the positioning of said directing means.

17. The spectroradiometer apparatus of claim 16, wherein said field stop lens means includes a field stop circular aperture upon which incoming radiation is focused for delimiting a circular field.

18. The spectroradiometer apparatus of claim 16 or 17, wherein said order stop lens means includes an order stop aperture for selection of spectral order.

19. The spectroradiometer apparatus of claim 16 or 17, wherein said color stop lens means includes a color stop aperture for selection of the spectral band to reach said photodetector.

20. The spectroradiometer apparatus of claim 16, wherein one of said lens means includes a solenoid actuated shutter to interrupt the passage of radiation through said sensor head.

21. The spectroradiometer apparatus of claim 16, wherein one of said lens means includes a rotating disk with radially aligned slits to alternatively permit and interrupt the passage of radiation through said sensor head.

22. The spectroradiometer apparatus of claim 16, wherein said dispersive prism means and said diffraction grating are linked so as to be tuned to the same wavelength.

23. The spectroradiometer apparatus of claim 16, wherein said first and second motive means are controlled by said electronic means to rotate in a stepwise manner so as to target a preselected source for the radiation.

24. The spectroradiometer apparatus of claim 16, including a folding mirror and spotting scope, said folding mirror being positioned in the path of the radiation emanating from said rotatable reflecting means, to allow visual targeting.

25. The spectroradiometer apparatus of claim 16, wherein said second motive means vertically rotates said rotatable reflecting means to position the apparatus on an elevational coordinate.

26. The spectroradiometer apparatus of claim 16, wherein said first motive means horizontally rotates said rotatable reflecting means to move the apparatus to an azimuthal coordinate.

27. The spectroradiometer apparatus of claim 16, wherein said motive means includes electro-optical means for detecting the position of said motive means.

28. The spectroradiometer apparatus of claim 16, wherein said third motive means is controlled by said electronic means to rotate in a stepwise manner so as to enable analysis of a plurality of discrete wavelengths.

29. A method for analyzing spectral radiance comprising directing incoming radiation into a hollowed body portion of a sensor head and at least a portion of said sensor head being movable;
selectively moving said hollowed body portion of said sensor head about a first axis;
selectively moving and positioning rotatable reflecting means in said sensor head about a second axis orthogonal to the first axis, movement of the hollowed body portion also effecting movement of the reflecting means;
focusing radiation emanating from said rotatable reflecting means;
dispersing the radiation into its spectral components to form dispersed radiation;
reflecting said dispersed radiation to form reflected radiation;
focusing said reflected radiation to form focused reflected radiation;
diffracting said focused reflected radiation by means of a diffraction grating to form diffracted radiation;
rotating said diffraction grating;
focusing said diffracted radiation to form focused diffracted radiation;
transforming said focused diffracted radiation into electrical signals;
electronically processing said electrical signals; and
electrically controlling the movement of said portion of said sensor head, the positioning of said rotatable reflecting means, and the rotation of said diffraction grating.

30. The method of claim 29, wherein the method further comprises the setp of correlating the preselected source with the data that is representative of at least part of the spectral components and control of the movement of the sensor head.

31. The method of claim 29, wherein moving said portion of said sensor head and positioning said reflecting means involves generating appropriate signals from a central processing unit, loading these signals into counters on stepper driver circuit cards, presenting counts from the counters to a programmable read only memory on the stepper driver circuit cards, addressing step commands from the programmable read only memory according to the counts presented, energizing motive means through power drivers according to the step commands, and moving said portion of said sensor head and positioning said reflecting means by said motive means.

* * * * *